United States Patent [19]

Wassenburg et al.

[11] 3,969,296

[45] July 13, 1976

[54] VINYL ESTER COPOLYMER LATICES AND THEIR PREPARATION

[75] Inventors: Teunis C. Wassenburg; William J. Van Westrenen, both of Delft, Netherlands

[73] Assignee: Shell Oil Company, Houston, Tex.

[22] Filed: Feb. 18, 1975

[21] Appl. No.: 550,483

[30] Foreign Application Priority Data
Mar. 1, 1974 United Kingdom............... 9328/74

[52] U.S. Cl................ 260/29.6 TA; 260/29.6 HN; 260/29.6 CM
[51] Int. Cl.² ........................................ C08L 27/06
[58] Field of Search............ 260/29.6 TA, 29.6 HN, 260/29.6 CM

[56] References Cited

UNITED STATES PATENTS

| | | | |
|---|---|---|---|
| 2,781,335 | 2/1957 | Cupery............................ | 260/29.6 HN |
| 3,202,625 | 8/1965 | Tess et al. ..................... | 260/29.6 TA |
| 3,294,727 | 12/1966 | Grommers et al............ | 260/29.6 TA |
| 3,350,339 | 10/1967 | Sekmakas...................... | 260/29.6 TA |
| 3,654,209 | 4/1972 | Bergmeister et al. ........ | 260/29.6 TA |

*Primary Examiner*—M. J. Welsh
*Attorney, Agent, or Firm*—Norris E. Faringer

[57] ABSTRACT

The preparation of vinyl ester copolymers is described. More particularly, vinyl ester copolymer latices are described which exhibit improved scrub resistance when applied to existing paint films.

6 Claims, No Drawings

VINYL ESTER COPOLYMER LATICES AND THEIR PREPARATION

BACKGROUND OF THE INVENTION

It is known that vinyl esters of saturated aliphatic monocarboxylic acids whose carboxyl groups are attached to a tertiary and/or quaternary carbon atom can be copolymerized in an emulsion in water with other ethylenically unsaturated monomers such as vinyl acetate, vinyl chloride, and esters of alpha-beta ethylenically unsaturated acids, preferably in the presence of a small amount of an alpha-beta ethylenically unsaturated acid, in the presence of free-radical supplying polymerization initiators, whereby various types of emulsifying or stabilizing agents for emulsions can be used. It is also known that such copolymer emulsions can be used advantageously in latex paints on many types of substrates, such as wood, stone, concrete, and asbestos cement, in combination with usual pigments for latex paints. So, for example, their use for exterior decoration of buildings is well known. Coats obtained with such paints are highly resistant to chemical and mechanical influences; they have low water absorption, and they stand up very well to the action of alkaline substances, such as concrete, or alkaline detergents; when applied to substrates outlined above they are also highly resistant to wet brushing with water or with detergents.

For further discussion relevant to the preparation of such vinyl ester latices see British Pat. No. 933,470; U.S. Pat. No. 3,186,974; U.S. Pat. No. 3,287,300 and U.S. Pat. No. 3,294,727, among many other patents.

Recently, however, a new field of application of latex paints has become of interest, namely, the application on glossy, usually old, solvent-borne paint films, in particular domestic paint films. The application on this substrate requires advanced adhesion characteristics, in particular against the usual wet-cleaning with cloth, sponge or wash-leather to which such paints are often subjected in household applications.

The present invention therefore provides a modification for vinyl ester latices as hereinbefore described, by which an improvement with respect to the aforesaid application on existing paint films is obtained. The modification comprises the copolymerization of a small amount of a glycidyl ester of an alpha-beta ethylenically unsaturated acid, followed by reaction with a small amount of ammonia. By the use of these additives the final copolymer product contains a small amount (as restricted by the amount of glycidyl ester and the amount of ammonia) of hydroxyaminopropyl ester groups.

SUMMARY OF THE INVENTION

The present invention is directed to a process for the preparation of a latex which comprises emulsion copolymerization in an aqueous medium of (A) a vinyl ester of a saturated aliphatic mono-carboxylic acid whose carboxyl group is attached to a tertiary and/or quarternary carbon atom with (B) one or more other ethylenically unsaturated polymerizable compounds, characterized in that at least one of compounds (B), herein referred to as "B1", is a glycidyl ester of an alpha-beta ethylenically unsaturated carboxylic acid having 3 to 4 carbon atoms per molecule, in an amount of from 0.5 to 5.0, preferably from 0.5 to 3.0, weight percent of the total amount of compounds (A) and (B), and that the copolymer formed is reacted with ammonia ($NH_3$) in an amount sufficient to convert at least 50%, and preferably all, of the glycidyl groups into hydroxyaminopropyl groups.

Alternatively, the invention can be defined as an aqueous copolymer latex, containing in the dispersed phase a copolymer having the residues of (A) a vinyl ester of a saturated aliphatic monocarboxylic acid whose carboxyl group is attached to a tertiary and/or quaternary carbon atom, and (B) one or more other ethylenically unsaturated polymerizable compounds, characterized in that at least one of the residues of components (B) is a residue of a hydroxyaminopropyl ester of an alpha-beta ethylenically unsaturated carboxylic acid having 3 to 4 carbon atoms per molecule in an amount of from 0.5 to 5.0, preferably 0.5 to 3.0 weight percent of the total amounts of the residues of components (A) and (B).

DESCRIPTION OF THE PREFERRED EMBODIMENT

Vinyl esters of saturated aliphatic mono-carboxylic acids whose carboxyl groups are attached to a tertiary and/or quaternary carbon atom are known compounds, see, for example, U.S. Pat. No. 3,186,977, U.S. Pat. No. 3,287,300 and U.S. Pat. No. 3,294,727. An example is vinyl pivalate.

Suitable saturated aliphatic monocarboxylic acids having the carboxyl groups attached to a tertiary and/or quaternary carbon atom are the so-called alpha-branched saturated monocarboxylic acids of the general formula:

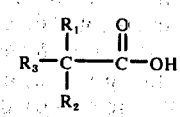

wherein $R_1$ and $R_2$ each represents the same or different alkyl radicals of normal, branched or cyclic structure and $R_3$ represents hydrogen or a hydrocarbyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals or normal, branched or cyclic structure, including methyl, ethyl, propyl, butyl, pentyl, hexyl, octyl, as well as alkaryl, aralkyl and aryl radicals. Very suitable such monocarboxylic acids include the alpha,alpha-dialkyl monocarboxylic acids having from 9 to about 22 carbon atoms in the molecule. A preferred group comprises the acids possessing from about 9 to 19 carbon atoms with those acids having from 9 to 11 being especially preferred. A suitable method for their preparation is disclosed in U.S. Pat. No. 3,047,662, U.S. Pat. No. 3,059,005 and U.S. Pat. No. 3,059,006.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

These alpha-branched monocarboxylic acids may be converted to their respective vinyl esters by well-known techniques such as those described in U.S. Pat. No. 3,186,974.

Preferred are vinyl esters of such monocarboxylic acids which contain 9–11, in particular, on average 10, carbon atoms per molecule.

The amount of vinyl esters of group (A) is usually between 10 and 50 percent by weight of total amount of monomers (A) and (B).

The other mono-olefinically unsaturated compounds under (B) (with the exception of glycidyl ester compounds) can be (component B2) vinyl esters of saturated monocarboxylic acids having 2–18 carbon atoms per molecule and having the carboxyl group attached to a primary or secondary carbon atom, such as preferably, vinyl acetate, or vinyl chloride, vinylidene chloride, or an ester of acrylic or methacrylic acid with a monohydric or dihydric alcohol having preferably from 1 to 20 carbon atoms per molecule, and having no epoxy alkyl group in the molecule, or mixtures thereof. The amount of components (B) described above is usually between 89.5 and 49.5 percent by weight of the total amount of (A) plus (B), the rest being compounds as described hereinafter.

A usual and preferred additive under (B), component B3, is a small amount of an aliphatic alpha-beta ethylenically unsaturated carboxylic acid having 3 or 4 carbon atoms per molecule, or a partial ester thereof, in an amount of from 0.5 to 5 percent by weight of the total amount of components (A) and (B). Acidic compounds of this type, are, for example, acrylic acid, methacrylic acid, crotonic acid, maleic acid, fumaric acid a-d monoalkyl esters of the last two carboxylic acids with monohydric alcohols having preferably from 1 to 20 carbon atoms per molecule.

Further components under (B) which may be used in small amounts are hydroxyalkyl esters of ethylenically unsaturated carboxylic acids having preferably 3 to 4 carbon atoms per molecule, such as hydroxyethyl acrylate, hydroxyethyl methacrylate, 2-hydroxypropyl acrylate, 2-hydroxypropyl methacrylate, (2-hydroxyethyl) maleates, (2-hydroxypropyl) maleates, and the corresponding esters of fumaric acid. The amount of such esters can be in the range of from 0 to 5 percent by weight of the total amount of components (A) and (B).

An essential component under (B) for the preparation of the instant latices is a glycidyl ester of an alpha-beta ethylenically unsaturated carboxylic acid having 3 to 4 carbon atoms per molecule in an amount of from 0.5 to 5.0, preferably 0.5 to 3.0, weight percent of the total amount of components (A) and (B). Examples of such glycidyl esters are: glycidyl acrylate, glycidyl methacrylate, monoglycidyl maleates, monoglycidyl fumarates, diglycidyl maleate, and diglycidyl fumarate. The preferred glycidyl ester of glycidyl methacrylate.

For the preparation of the instant latices it is essential that ammonia ($NH_3$) is added after the polymerization, in an amount sufficient to convert at least 50%, and preferably all, of the glycidyl groups into hydroxyaminopropyl groups. Part of the ammonia added can be used up to neutralize acidic groups, if monomer components under (B) containing acidic groups are used. A temperature of from 60° to 90°C is preferred for the reaction of the ammonia with the glycidyl groups. The ammonia is preferably added as an aqueous solution.

The copolymerization can be performed by conventional means for free-radical induced polymerization, as known in the art, either batchwise or continuously, preferably in the absence of oxygen, and in the presence of emulsifying and/or stabilizing agents for latices, such as anionic, non-ionic or cationic emulsifying agents, and stabilizing agents or protective colloids, for example, water-soluble cellulose derivatives, polyvinyl alcohol, and natural products, such as gum arabic, casein, alginates, seaweed extracts, starches and starch ethers.

So, for example, the reactor can be charged with water, initiator, emulsifying agent (and protective colloid), and preferably some of the monomer mixture, brought to polymerization temperature, and then the rest of the monomer mixture can be added gradually, with addition, if needed, of further amounts of initiator. The monomers can also be added as a "pre-emulsion", that is an emulsion of monomers in an aqueous medium containing one or more emulsifying agents, and preferably initiator. While keeping this pre-emulsion well below polymerization temperature, a gradual addition within some hours time will not meet difficulties.

Latices according to the invention can be compounded with other ingredients usual in latex paints, such as pigments, fillers, dyestuffs, thixotroping agents, anti-freezing agents, plasticizers, organic solvents in small amounts, and so on.

The invention is illustrated by the following examples. Parts therein are parts by weight. The substrates were tin plate panels, covered with a blue gloss paint dried at 25°C and stoved 4 hours at 140°C. The emulsion paint to be tested was applied to the substrate with a bar applicator, and allowed to dry at room temperature for at least 3 days.

The scrub resistance was tested with a conventional scrub tester, in which the brushes were replaced by rubber-faced circular pads covered with cloth. The water supply was maintained at 45°C, and the water supply was allowed to operate for 15 minutes before commencing testing. The pads were loaded with 2-0 grams, lowered on to the panels, and the machine was started. The numbers of strokes required to break through to the blue substrate were noted. "VeoVa" 10 was a commercially obtainable vinyl ester of saturated aliphatic monocarboxylic acids whose carboxyl groups are attached to a tertiary and/or quaternary carbon atom, and which acids contained on average 10 carbon atoms per molecule ("VeoVa" is a registered trade mark). "Pbw" means parts by weight. "Fenopon", "Tergitol", "Omya", "Tamol", "Triton", "Bevaloid", "Texanol" are registered trade marks and are conventional surfactants used to prepare latex emulsions.

EXAMPLE I

A reactor provided with a stirrer, gas-inlet tube, gas-outlet tube, and a tube connected with the pre-emulsion vessel was charged with:

| | | |
|---|---|---|
| Water | 25.0 | pbw |
| "Fenopon SF-78" | 0.3 | pbw |
| $K_2S_2O_8$ | 0.1 | pbw |
| Borax | 0.05 | pbw |

The reactor charge is flushed with nitrogen and heated to 72°C.

A pre-emulsion was prepared, consisting of:

| | | |
|---|---|---|
| Water | 56.0 | pbw |
| "Fenopon SF-78" | 0.2 | pbw |
| "Tergitol" NP 40 (25%) | 10.0 | pbw |
| $K_2S_2O_8$ | 0.4 | pbw |
| Borax | 0.45 | pbw |
| "VeoVa" 10 | 25.0 | pbw |
| Vinyl Acetate | 72.0 | pbw |
| Glycidyl Methacrylate | 2.0 | pbw |
| Acrylic acid | 1.0 | pbw | in a separate vessel under nitrogen, and pumped at a gradually increasing rate into the reactor, whose temperature is maintained at 75°–78°C during the polymerization. After a digestion period of 1 hour at 80°C 2.0 pbw of aqueous ammonia (25 wt % $NH_3$) were added, and the emulsion was kept at 80°C during 1 hour.

The latex contains about 50 wt % of copolymer.
A latex paint was compounded, consisting of:

| | | |
|---|---|---|
| Tioxide RCR 3 (white pigment) | 200.0 | pbw |
| Chalk "Omya" BLP/3 | 100.0 | pbw |
| Sodium hexametaphosphate 10% | 15.0 | pbw |
| "Tamol" 731 (25%) | 1.2 | pbw |
| Triton CF-10 (25%) | 3.0 | pbw |
| Bevaloid 677 | 1.0 | pbw |
| Water | 50.0 | pbw |
| Texanol | 21.0 | pbw |
| Ethylene glycol | 21.0 | pbw |
| | 412.2 | pbw |
| and the latex as prepared hereinbefore described (about 50% solids) | 450.0 | pbw |

The pigment volume concentration was about 30%, and the solids content was about 60%.

EXAMPLE II

Evaluation results in the wet-scrub method described above with various latex paint formulations in which the only difference lies in the polymer and its post-treatment (the latex recipe is the same as in Example I).

| Latex type | Number of scrubs to first failure |
|---|---|
| (1) Vinylacetate/"VeoVa" 10/ acrylic acid 74/25/1 | 100–120 |
| (2) Vinylacetate/"VeoVa" 10/ glycidyl methacrylate/ acrylic acid 72/25/2/1 (without treatment with $NH_3$) | 100–120 |
| (3) As (2), but with treatment with $NH_3$ (according to the invention) | 2750–3000 |

We claim as our invention:

1. A process for the preparation of vinyl ester latices having improved scrub resistance which comprises first copolymerizing in an aqueous emulsion medium a composition comprising
   1. from 10 to 50% of a vinyl ester of a saturated aliphatic alpha-branched monocarboxylic acid with
   2. from 0.5 to 5.0% of a glycidyl ester of an alpha, beta-ethylenically unsaturated carboxylic acid having from 3 to 4 carbon atoms,
   3. from 49.5 to 89.5% of vinyl acetate or vinyl chloride,
   4. from 0.5 to 5.0% of an alphatic alpha, beta-ethylenically unsaturated carboxylic acid having 3 to 4 carbon atoms or a partial ester thereof, and then reacting at from 60° to 90°C the resulting copolymer with ammonia in an amount sufficient to convert at least 50% of the glycidyl groups into hydroxyaminopropyl groups, said percentages being by weight based on total monomers.

2. A process as in claim 1 wherein component (1) is a vinyl ester of a saturated aliphatic monocarboxylic acid having 9 to 11 carbon atoms per molecule.

3. A process as in claim 1 wherein component (2) is glycidyl methacrylate.

4. A process as in claim 3 wherein the amount of glycidyl methacrylate is from 0.5 to 3.0%.

5. A process as in claim 1 wherein the copolymer formed is reacted with sufficient ammonia to convert all the glycidyl groups into hydroxyaminopropyl groups.

6. A process for the preparation of a vinyl ester copolymer latex having improved scrub resistance which comprises
   A. first copolymerizing in an aqueous emulsion medium a composition comprising
      1. from 10 to 50% of a vinyl ester of a saturated alpha-branched monocarboxylic acid having from 9 to 11 carbon atoms per molecule,
      2. from 49.5 to 89.5% of vinyl acetate,
      3. from 0.5 to 5.0% of glycidyl methacrylate, and
      4. from 0.5 to 5% of acrylic acid, and
   B. then reacting the resulting copolymer at from 60° to 90°C with ammonia in an amount sufficient to convert at least 50% of the glycidyl groups into hydroxyaminopropyl groups, said percentages being by weight based on the total monomers present.

* * * * *